3,243,467
OLIGOMERIZATION OF CONJUGATED DIENES
Ernest A. Zuech, Bartlesville, Okla., assignor to Phillips Petroleum Company, a corporation of Delaware
No Drawing. Filed Sept. 23, 1963, Ser. No. 310,933
3 Claims. (Cl. 260—666)

This invention relates to the oligomerization of conjugated dienes. In one aspect, this invention relates to novel catalysts for the oligomerization of conjugated dienes. In another aspect, it relates to a process for producing novel catalysts for the oligomerization of conjugated dienes. In a still further aspect, the invention relates to a process for the oligomerization of conjugated dienes.

Various processes have been developed for the dimerization and trimerization of conjugated dienes. For example, when 1,3-butadiene is contacted with a catalyst system comprising an organoaluminum such as triethylaluminum and a reducible metal halide such as titanium tetrachloride, good yields of 1,5,9-cyclododecatriene can be obtained. Other processes have been developed for converting butadiene to dimers, including both vinylcyclohexene and 1,5-cyclooctadiene. Since these cyclic dimers and trimers are useful as intermediates for the production of a wide variety of compounds, processes for their production in good yields have considerable potential value.

Recently, in copending application Serial No. 290,158, field June 24, 1963, of E. A. Zuech, it was shown that reducible phosphine complexes with metal halides such as nickel chloride serve, after reduction with an organometallic reducing agent, as efficient catalysts for the oligomerization of conjugated dienes. While this process has many advantages, particularly with respect to the high yields of dimers and trimers obtained, it must be recognized that any process involving the use of organometallic compounds has certain inherent hazards in its operation and requires considerable amounts of these relatively expensive materials.

It is thus an object of this invention to provide new catalysts for the production of cyclic dimers and trimers of conjugated dienes. Another object of the invention is to provide a process for the oligomerization of conjugated dienes. A still further object of the invention is to provide a process for the formation of novel catalysts for the oligomerization of conjugated dienes.

Other objects, advantages and features of the invention will be readily apparent to those skilled in the art from the following description and the appended claims.

According to the process of the invention, conjugated dienes can be converted to cyclic dimers and trimers in good yields by contacting a diene selected from the group consisting of 1,3-butadiene, isoprene and piperylene with the reduction product obtained by admixing (a) a reducing agent selected from the group consisting of lithium, potassium, cesium, sodium, rubidium and calcium with (b) a compound of the formulas

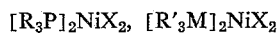

and

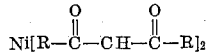

wherein M is selected from the group consisting of antimony and arsenic; X is a halogen selected from the group consisting of chlorine, bromine and iodine; each R is a hydrocarbon radical selected from the group consisting of alkyl, cycloalkyl, aryl, alkylcycloalkyl, cycloalkylalkyl, alkaryl and aralkyl radicals containing from 1 to 10 carbon atoms, inclusive; and each R' is selected from the group consisting of alkyl and cycloalkyl radicals containing from 1 to 10 carbon atoms; the reduction being carried out in the presence of a solvent for the elemental metal reducing agent, said solvent being selected from the group consisting of ammonia and selected amines, and said admixing being carried out in the presence or absence of an electron donor compound.

The term "oligomer" as employed herein contemplates generically the cyclic dimers and trimers formed according to this invention.

Of the alkali metal and calcium reducing agents specified above, sodium is the preferred reducing agent. Ammonia is a suitable solvent for all of the elemental reducing agents, while methylamine can be employed where sodium or lithium is to be used and ethylenediamine can be employed where lithium is to be used.

Some examples of the compounds of the above general formulas which can be reduced with the elemental metals and whose reduction product is useful as catalysts are:

bis(triphenylphosphine)dichloronickel,
bis(trimethylphosphine)dibromonickel,
bis(tri-n-hexylphosphine)diiodonickel,
bis(tri-n-decylphosphine)dichloronickel,
bis(tribenzylphosphine)dibromonickel,
bis(tri-[4-n-butylphenyl]phosphine)dichloronickel,
bis(trimethylstibine)dichloronickel,
bis(triisopropylstibine)dibromonickel,
bis(tri-n-heptylstibine)diiodonickel,
bis(tridecylstibine)dichloronickel,
bis(tricyclodecylarsine)dibromonickel,
bis(tri-[4-n-butylcyclohexyl]stibine)dichloronickel,
bis(triethylarsine)dichloronickel,
bis(tri-n-pentylarsine)dibromonickel,
bis(tri-n-decylarsine)diiodonickel, and the nickel chelates of the following ketones:

acetylacetone,
2,4-hexanedione,
2,4-octanedione,
1-phenyl-1,3-butanedione,
1-cyclohexyl-1,3-butanedione,
1,3-diphenyl-1,3-propanedione,
1,5-diphenyl-2,4-pentanedione,
8,10-heptadecanedione,
11,13-trieicosanedione, and
1,3-ditolyl-1,3-propanedione.

As defined above, the formation of the catalyst by reduction can be conducted in the presence or absence of a compound serving as an electron donor. Suitable electron donor compounds include cyclic polyenes such as 1,5-cyclooctadiene and bicycloheptadiene and compounds of the formula $R_3P$, wherein R is as defined above. Compounds of the formula $R_3P$ which can be used if desired are: trimethylphosphine, triethylphosphine, triisopropylphosphine, tri-tert-butylphosphine, tri-n-decylphosphine, triphenylphosphine, trinaphthylphosphine, tribenzylphosphine, tri(4-phenylbutyl)phosphine, tritolylphosphine, tri-(4-butylphenyl)phosphine, and the like.

The oligomerization reaction of this invention is carried out by contacting butadiene, isoprene, or piperylene with the above-defined reduction products. If desired, an oligomerization diluent can be employed after flashing off the reduction solvent (ammonia or amine). Suitable diluents include, for example, benzene and cyclohexane. The reduction is conducted at a temperature in the range of from −25° to 50° C., while the oligomerization is carried out at a temperature ranging from 25° to 150° C., preferably from 50° to 120° C. The oligomerization can be effected as a batchwise or continuous reaction, the reaction times varying from a few seconds to several hours, for example from ten minutes to 24 hours. The pressure in the oligomerization reaction zone will generally be autogenous. ylphosphine)dichloronickel except the last run, which used nickel acetylacetonate.

Table I

| Run No. | Millimols [Ph₃P]₂NiCl₂ | Grams Bd | Electron Donor | Millimols Electron Donor | Temp., °C. | Time, Hrs. | Batch Yields, Percent ||||
|---|---|---|---|---|---|---|---|---|---|---|
| | | | | | | | VCH | COD | CDT | Nonvolatiles[a] |
| 1 | 6 | 126 | (Ph)₃P | 18 | 80 | 4 | 21 | [b]64(71) | 3 | 2 |
| 2 | 6 | 125 | None | | 80 | 4 | 9 | 27(64) | 4 | 2 |
| 3 | 6 | 133 | (Ph)₃P | 18 | 100 | 0.7 | 16 | 63(72) | 5 | 3 |
| 4 | 3 | 130 | (Ph)₃P | 18 | 100 | 2 | 17 | 67(75) | 4 | 2 |
| 5 | 6 | 128 | COD | 72 | 100 | 1 | 16 | 49(61) | 11 | 4 |
| 6 | [c]3 | 126 | (Ph)₃P | 18 | 100 | 0.6 | 20 | 60(68) | 5 | 3 |

[a] The nonvolatiles were materials boiling higher than CDT.
[b] The figures in parentheses are the ultimate yields for COD, as the total of the batch yields gives the conversion; thus, in Run 1, $\frac{64}{21+64+3+2}(100) = 71\%$ ultimate yield.
[c] Nickel acetylacetonate was used in this run.

The mol ratios of elemental metal reducing agent to substituted dihalonickel compound will range from about 1/1 to 2/1. Larger amounts of elemental metal should be avoided, as these metals cause the polymerization of conjugated dienes to polymers of considerably higher molecular weight than dimers and trimers. The amount of oligomerization catalyst employed per 100 grams of conjugated diene will be that obtained by reduction of from 1 to 10 grams of substituted dihalonickel compound.

If an electron donor is employed, the amount of added compound can range from 0 to 20 mols per mol of substituted dihalonickel compound charged. The reaction does not require added electron donor compound, but it can be used if desired.

The following specific example describes a number of runs in which butadiene was converted to cyclic dimers and trimers according to the inventive process. However, it is not intended that the invention be limited to the particular embodiments illustrated in these runs, either to reaction conditions, catalyst components, or charged diene.

EXAMPLE

A series of runs was carried out in which 1,3-butadiene was converted to dimers and trimers according to the process of the invention. The results of these runs are expressed as Table I. In Table I, 4-vinylcyclohexene is denoted as VCH, 1,3-butadiene is denoted as Bd, 1,5-cyclooctadiene is shown as COD, and 1,5,9-cyclododecatriene is shown as CDT. Each of the runs was conducted with about 125 grams of butadiene, 2 molar equivalents of sodium, and 30 to 40 grams of ammonia.

In a typical run, the following procedure was used. A 300 cc. autoclave was charged with the desired amount of bis(triphenylphosphine)dichloronickel, the desired amount of electron donor (if used), and 2 mols of sodium per mol of the nickel compound. The mixture was then cooled in a Dry Ice-acetone bath and evacuated. Added as a liquid were 30 to 40 grams of ammonia, and the resultant mixture was allowed to warm to 5° to 10° C., requiring approximately 30 to 40 minutes. The ammonia was then vented with the system again being evacuated, care being taken to avoid contacting the reaction mixture with air or moisture. During this venting of ammonia, the autoclave temperature dropped to well below 0° C. Approximately 125 grams of butadiene was then introduced, and the resulting mixture was heated to either 80° C. or 100° C. for from .6 to 4 hours.

After the reaction period, the reaction mixture was distilled, and the material boiling over the range of 60° C. (10 mm.) to 70° C. (1 mm.) was analyzed by gas-liquid chromatography. The results of these runs are expressed below in Table I. All runs in this table used bis(triphenylphosphine)dichloronickel except the last run, which used nickel acetylacetonate.

The compounds obtained according to the process of the invention are valuable starting products for further synthesis reactions; for example, cyclooctadi-1,5-ene may be used for obtaining suberic acid or the corresponding 9-membered lactam, cyclododecatri-1,5,9-ene may be used for obtaining dodecanic diacid or the 13-membered lactam. Both the dicarboxylic acids and the lactams are valuable monomers for the production of polyesters or polyamides. Styrene is obtained from vinyl cyclohexene by dehydrogenation.

Various modifications of this invention can be made or followed, in view of the foregoing, without departing from the spirit or the scope thereof.

I claim:

1. In a process for the oligomerization of conjugated dienes which comprises contacting said dienes with the reduction product obtained by mixing a reducing agent selected from the group consisting of lithium, potassium, sodium, cesium, rubidium, and calcium with a substituted nickel compound of the formulas

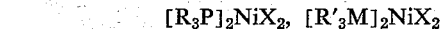

and

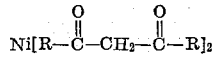

wherein M is selected from the group consisting of antimony and arsenic; X is a halogen selected from the group consisting of chlorine, bromine and iodine; each R is a hydrocarbon radical selected from the group consisting of alkyl, cycloalkyl, aryl, alkylcycloalkyl, alkaryl, and aralkyl radicals containing from 1 to 10 carbon atoms, inclusive; and each R' is selected from the group consisting of alkyl and cycloalkyl radicals containing from 1 to 10 carbon atoms the improvement which comprises carrying out the formation of said reduction product in a solvent for said reducing agent.

2. A process according to claim 1 wherein said solvent for said reducing agent is selected from the group consisting of ammonia, methylamine and ethylenediamine.

3. A process according to claim 1 wherein said mixing of said reducing agent and said substituted nickel compound is in the presence of an electron donor.

References Cited by the Examiner

UNITED STATES PATENTS 3,148,224  9/1964  Luttinger _____ 260—666

FOREIGN PATENTS 1,301,247  9/1961  France.

DELBERT E. GANTZ, *Primary Examiner.*

V. O'KEEFE, *Examiner.*